United States Patent
Clausen et al.

(10) Patent No.: US 11,695,548 B1
(45) Date of Patent: *Jul. 4, 2023

(54) SYSTEMS AND METHODS FOR NETWORK AUTHENTICATION WITH A SHARED SECRET

(71) Applicant: Wells Fargo Bank, N.A., San Francisco, CA (US)

(72) Inventors: Christopher P. Clausen, Novato, CA (US); Jeffrey A. Cornman, San Francisco, CA (US); David J. Dietrich, Charlotte, NC (US); Jinee K. Ellis, San Francisco, CA (US); Chirstopher P. Smith, Omaha, NE (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,024

(22) Filed: Jan. 24, 2022

Related U.S. Application Data (63) Continuation of application No. 15/632,094, filed on Jun. 23, 2017, now Pat. No. 11,233,634.

(51) Int. Cl.
*H04L 9/08* (2006.01)
*H04L 9/40* (2022.01)
(Continued)

(52) U.S. Cl.
CPC ............ *H04L 9/0838* (2013.01); *G06F 21/31* (2013.01); *H04L 9/0863* (2013.01);
(Continued)

(58) Field of Classification Search
CPC ... H04L 9/0838; H04L 9/0863; H04L 9/3226; H04L 61/5014; H04L 63/083;
(Continued)

(56) References Cited

U.S. PATENT DOCUMENTS 7,024,557 B1 4/2006 Moles et al.
7,240,202 B1 7/2007 Orman
(Continued)

OTHER PUBLICATIONS

Kindberg et al., "Authenticating public wireless networks with physical evidence", 2009 IEEE International Conference on Wireless and Mobile Computing, Networking and Communications, IEEE 2009. 6 pages.

(Continued)

*Primary Examiner* — Khalid M Almaghayreh
(74) *Attorney, Agent, or Firm* — Foley & Lardner LLP (57) ABSTRACT

A computing system can associate a customer device of a customer with a financial transaction record and the merchant, the financial transaction record indicative of a first purchase from the merchant by the customer, transmit a first query to the customer device prompting the customer to input information regarding an aspect of the first purchase, the first query including a description of a predetermined product parameter of the financial transaction record indicative of the first purchase from the merchant by the customer, authenticating, by the computing system, the first request by determining that the customer-input response to the first query corresponds to the established aspect of the first purchase in accordance with a predetermined accuracy threshold, and authorizing, by the computing system, connection of the customer device to the network provided by the merchant based at least in part on the first request being authenticated.

20 Claims, 5 Drawing Sheets

(51) Int. Cl.
   *H04L 67/00*     (2022.01)
   *H04L 9/32*      (2006.01)
   *G06F 21/31*     (2013.01)
   *H04L 61/5014*   (2022.01)

(52) U.S. Cl.
   CPC ........ *H04L 9/3226* (2013.01); *H04L 61/5014* (2022.05); *H04L 63/083* (2013.01); *H04L 63/0892* (2013.01); *H04L 67/34* (2013.01)

(58) Field of Classification Search
   CPC ..... H04L 63/0892; H04L 67/34; H04L 63/10; H04L 63/08; H04L 9/3263; G06F 21/31; G06F 21/123; G06F 21/30; G06F 21/44; G06F 21/45; G06Q 20/0838; G06Q 20/3674; G06Q 20/401; G06Q 20/3821; G06Q 50/265
   See application file for complete search history.

(56) References Cited

U.S. PATENT DOCUMENTS

| | | | |
|---|---|---|---|
| 7,349,871 B2 | 3/2008 | Labrou et al. | |
| 7,577,836 B2 | 8/2009 | Puranik et al. | |
| 8,423,476 B2 * | 4/2013 | Bishop | G07F 7/0866 |
| | | | 705/72 |
| 8,700,729 B2 | 4/2014 | Dua | |
| 8,719,573 B2 | 5/2014 | Ran et al. | |
| 8,751,801 B2 * | 6/2014 | Harris | H04L 9/3231 |
| | | | 713/168 |
| 9,038,196 B2 | 5/2015 | Liberman et al. | |
| 9,100,175 B2 | 8/2015 | Nix | |
| 9,298,898 B2 * | 3/2016 | Koch | H04L 63/08 |
| 2009/0037269 A1 * | 2/2009 | Bassemir | G06Q 30/02 |
| | | | 705/14.39 |
| 2010/0242104 A1 * | 9/2010 | Wankmueller | G06F 21/36 |
| | | | 726/9 |
| 2011/0302607 A1 * | 12/2011 | Warrick | H04N 21/41265 |
| | | | 725/39 |
| 2012/0184274 A1 | 7/2012 | Lopresti et al. | |
| 2012/0192258 A1 * | 7/2012 | Spencer | H04W 8/18 |
| | | | 726/7 |
| 2013/0124285 A1 | 5/2013 | Pravetz et al. | |
| 2014/0068723 A1 * | 3/2014 | Grim | H04L 63/08 |
| | | | 726/4 |
| 2014/0189829 A1 * | 7/2014 | McLachlan | G06Q 20/4014 |
| | | | 726/6 |
| 2014/0195380 A1 * | 7/2014 | Jamtgaard | G06Q 30/0601 |
| | | | 709/224 |
| 2014/0248852 A1 * | 9/2014 | Raleigh | H04W 12/068 |
| | | | 455/566 |
| 2015/0026779 A1 | 1/2015 | Ilsar et al. | |
| 2015/0088746 A1 * | 3/2015 | Hoffman | G06Q 20/40145 |
| | | | 705/44 |
| 2015/0088756 A1 * | 3/2015 | Makhotin | G06Q 20/32 |
| | | | 705/71 |
| 2015/0120559 A1 * | 4/2015 | Fisher | G06Q 20/3224 |
| | | | 705/44 |
| 2015/0195289 A1 * | 7/2015 | Kalgi | H04L 63/083 |
| | | | 726/5 |
| 2015/0312780 A1 | 10/2015 | Wang et al. | |
| 2016/0088026 A1 | 3/2016 | Mohamad Abdul et al. | |
| 2016/0191499 A1 | 6/2016 | Momchilov et al. | |
| 2016/0212695 A1 | 7/2016 | Lynch et al. | |
| 2017/0118190 A1 * | 4/2017 | Livesay | H04L 63/0815 |
| 2018/0285877 A1 * | 10/2018 | Bracconeri | G06Q 20/405 |

OTHER PUBLICATIONS

Kiwan et al., "Advanced Security Methodologies for Spontaneous Networks", Electric Vehicle Conference (IEVC) 2013 IEEE International. 7 pages.

* cited by examiner

SYSTEMS AND METHODS FOR NETWORK AUTHENTICATION WITH A SHARED SECRET

CROSS-REFERENCE TO RELATED PATENT APPLICATIONS

This application is a continuation of U.S. Pat. No. 11,233,634, filed Jun. 23, 2017, the content of which is hereby incorporated by reference in its entirety and for all purposes as if completely and fully set forth herein.

BACKGROUND

One common avenue for fraudsters to steal private information of other individuals is through a so called "evil twin" network. In such a scheme, the fraudster establishes a network access point (e.g., a mobile hotspot) in a location associated with a legitimate network (e.g., a network associated with a merchant). The fraudster configures the access point to mimic the legitimate network (e.g., in name and appearance). Individuals connect to the fraudulent network and communicate private information (e.g., payment credentials) with various other entities. The fraudster intercepts these communications and gains access to the private information. Thus, it would be beneficial to provide a system that diminishes the efficacy of such schemes.

SUMMARY

An embodiment relates to a computer-implemented method. The method can include associating, by a computing system, system associated with a merchant, a customer device of a customer with a financial transaction record and the merchant, the financial transaction record indicative of a first purchase from the merchant by the customer and completed a predetermined period of time prior to a first request to connect to a network provided by the merchant, receiving, by the computing system, the first request to connect to the network provided by the merchant from the customer device after completion of the purchase, selecting, by the computing system, the financial transaction based on the predetermined time period and the merchant, transmitting, by the computing system, a first query to the customer device prompting the customer to input information regarding an aspect of the first purchase, the first query including a description of a predetermined product parameter of the financial transaction record indicative of the first purchase from the merchant by the customer, the aspect of the first purchase established as a network authentication credential for the customer for the network provided by the merchant, receiving, by the computing system, a customer-input response to the first query, authenticating, by the computing system, the first request by determining that the customer-input response to the first query corresponds to the established aspect of the first purchase in accordance with a predetermined accuracy threshold, and authorizing, by the computing system, connection of the customer device to the network provided by the merchant based at least in part on the first request being authenticated.

Another embodiment relates to a computing system. The computing system can include a network interface enabling the computing system to exchange information over a network provided by the merchant, a customer database configured to store information pertaining to a plurality of customer purchases of a plurality of customers, wherein the customer purchases are from the merchant, and a processing circuit configured to associate a customer device of a customer with a financial transaction record and the merchant, the financial transaction record indicative of a first purchase from the merchant by the customer and completed a predetermined period of time prior to a first request to connect to a network provided by the merchant, receive, by the network interface, the first request to connect to the network from the customer device after completion of the first purchase, select the financial transaction based on the predetermined time period and the merchant, transmit, by the network interface, a first query to the customer device prompting the customer to input information regarding an aspect of the first purchase, the first query including a description of a predetermined product parameter of the financial transaction record indicative of the first purchase from the merchant by the customer, the aspect of the first purchase established as a network authentication credential for the customer for the network provided by the merchant, receive, by the network interface, a customer-input response to the first query, authenticate the first request by determining that the customer-input response to the first query corresponds to the established aspect of the first purchase in accordance with a predetermined accuracy threshold, and authorize connection of the customer device to the network based at least in part on the first request being authenticated.

Another embodiment relates to a non-transitory computer readable media having computer-executable instructions embodied therein that, when executed by a computing system, causes the computing system to perform operations to authorize a request to connect to a network. The operations can include associating a customer device of a customer with a financial transaction record and the merchant, the financial transaction record indicative of a first purchase from the merchant by the customer and completed a predetermined period of time prior to a first request to connect to a network provided by the merchant, receiving the first request to connect to a network from the customer device after completion of the first purchase, selecting the financial transaction based on the predetermined time period and the merchant, transmitting a first query to the customer device prompting the customer to input information regarding an aspect of the first purchase, the first query including a description of a predetermined product parameter of the financial transaction record indicative of the first purchase from the merchant by the customer, the aspect of the first purchase established as a network authentication credential for the customer for the network provided by the merchant, receiving a customer-input response to the first query, authenticating the first request by determining that the customer-input response to the first query corresponds to the established aspect of the first purchase in accordance with a predetermined accuracy threshold, and authorizing connection of the customer device to the network based at least in part on the first request being authenticated.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

DETAILED DESCRIPTION

Before turning to the figures, which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for authenticating a customer request to connect to a network are shown, according to various example embodiments. In particular, the figures include a merchant computing system associated with a merchant. A customer may engage in a transaction at the merchant and also seek to connect to a network (e.g., a local network established via a WI-FI connection) provided by the merchant. Such a pattern of interactions between the customer and the merchant creates an opportunity to enhance the security of the customer's private information. More specifically, the merchant computing system enables the customer to establish a shared secret as a network authentication credential. The shared secret may be generated based on the relationship (e.g., past financial or non-financial transactions) between the customer and the merchant. This way, if the customer seeks to connect to a network at the merchant and is not asked for the shared secret, the customer is aware of a potentially fraudulent scheme. Therefore, systems and methods disclosed herein enable mutual (two-way) authentication between the customer and the merchant. As such, the systems and methods disclosed herein facilitate enhanced security of private customer information.

The embodiments and implementations of the systems and methods disclosed herein improve current network authentication systems by enabling customers to establish dynamic authentication credentials for networks at specific locations. For example, on an airline, the customer's seat number may be established as a network authentication credential. Such credentials make it much more difficult for fraudsters to emulate networks provided at various merchants. If the customer is not asked for the credential when attempting to access the network, then the customer is made aware of the potential for fraud.

Additionally, the systems and methods disclosed herein provide a unique solution to the problem of establishing a shared secret credential between a customer and a merchant. Specifically, the systems and methods disclosed herein utilize information regarding a first service provided by the merchant to a customer (e.g., the sale of a product) to authenticate the customer with respect to a second service (e.g., connection to a local network) provided by the merchant to the customer. Use of such information provides benefits over current authentication systems. Because information regarding the first service provided to the customer is readily and uniquely available to the merchant (e.g., information regarding customer purchases may be stored at a computing system associated with a merchant), the merchant may pre-emptively establish information regarding the first service to authenticate the customer with respect to the second service. Thus, when the customer seeks to utilize the second service, a shared secret credential including information known or readily available may be available for use in authenticating the customer. This is a benefit over current systems, which may require the customer to obtain information (e.g., read a unique code) prior to a shared-secret credential being established. As such, the systems and methods disclosed herein provide efficiency and security benefits and a more convenient customer experience over current systems.

Additionally, because the first service provided by the merchant to the customer is not necessarily tied to the second service, the systems and methods disclosed herein provide for greater flexibility in terms of customer authentication processes than provided by current systems. In an example, for a first customer utilization of the second service, the merchant may select data regarding a first customer transaction as a shared secret credential. For a second customer utilization of the second service, the merchant may select data regarding a second customer transaction. In this example, the first and second customer transactions may occur in any order (e.g., the second customer transaction may occur prior to the first customer transaction). Due to this flexibility, the merchant may regularly update the customer's shared secret credential, even if no additional information regarding the customer becomes available between customer utilizations of the second service. Such updating further enhances the security of customer information. Thus, the systems, methods, and computer implementations disclosed improve current network security methods by providing functionalities that are novel and non-obvious over current systems.

Figure 1:
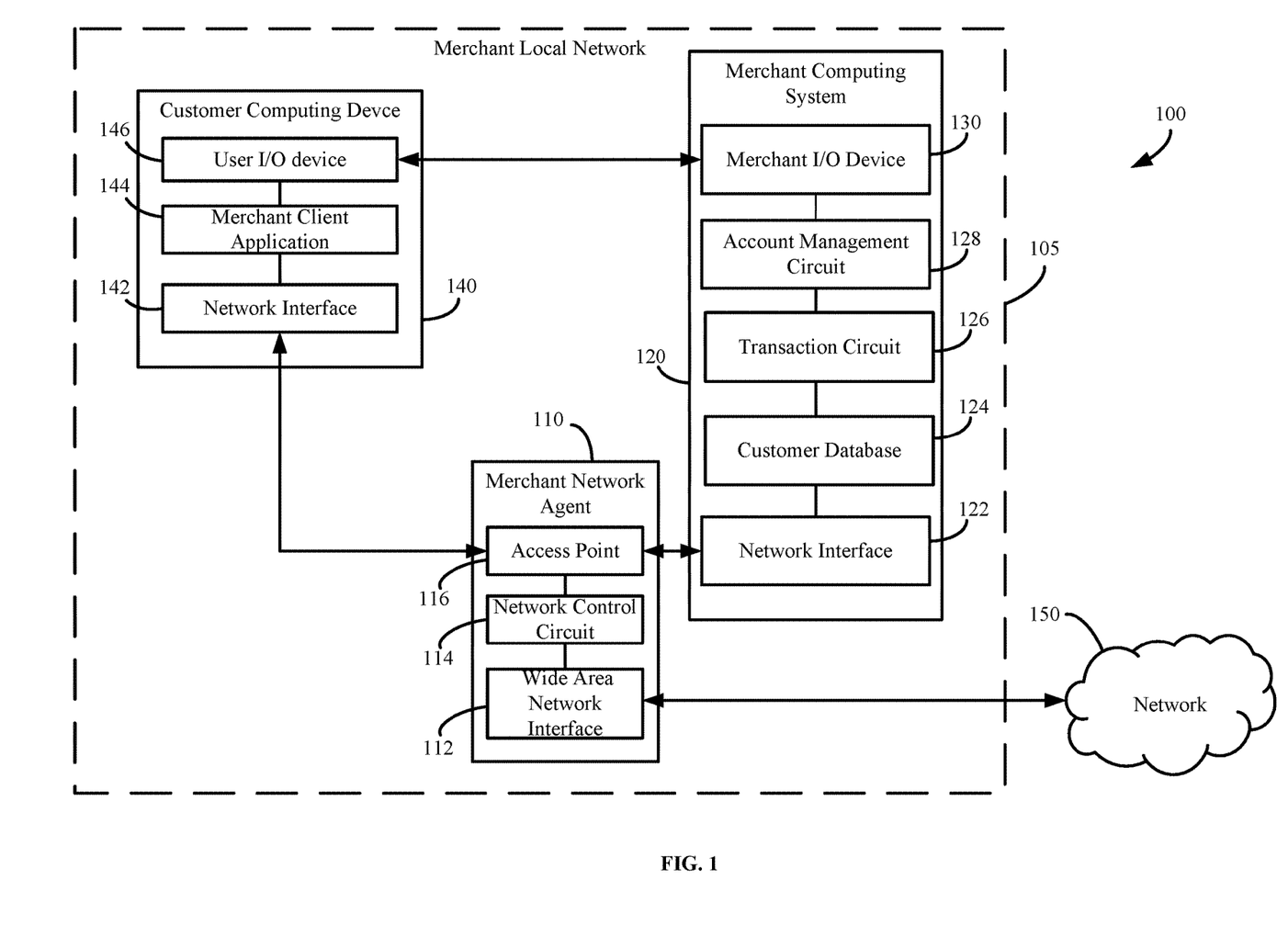
FIG. 1 is a block diagram of a network security system, according to an example embodiment.

Referring now to FIG. 1, a block diagram of a network security system 100 is shown according to an example embodiment. As described in further detail below, the network security system 100 facilitates enhanced security of a merchant local network 105 by establishing a shared secret between a customer and a merchant as a network authentication credential. The network security system 100 includes a merchant network agent 110 and a merchant computing device 120, both associated with a merchant, and a customer computing device 140 associated with a customer. Various components of the network security system 100 may be configured to communicate over the network 150. The network 150 is a data exchange medium, which may include wireless networks (e.g., cellular networks, Bluetooth®, WI-FI, Zigbee®, etc.), wired networks (e.g., Ethernet, DSL, cable, fiber-based, etc.), or a combination thereof In some embodiments, the network 150 includes the internet.

The merchant network agent 110 is a device associated with the merchant and configured to generate the merchant local network 105 through being communicatively coupled to the network 150. In various embodiments, the merchant may be any entity that provides any sort of product or service to customers. For example, the merchant may be a financial institution, a brick-and-mortar merchant (e.g., a restaurant or a coffee shop), an airport, or any other entity. Merchant network agent 110 may include any device capable of establishing a connection and communicating data with an external device. In some arrangements, the merchant network agent 110 includes a wireless router configured to communicate information over the network 150 and generate wireless signals that are broadcasted to create the merchant local network 105.

The merchant network agent 110 is shown to include a wide area network interface 112 which enables the network agent 110 to exchange data over the network 150, a network control circuit 114, and an access point 116. The access point 116 is configured to broadcast a wireless network signal capable of being received by external computing devices (e.g., the merchant computing system 120, the customer computing device 140, etc.) to facilitate the connection of the external computing devices to create the merchant local network 105. In some arrangements, the wireless network signal broadcasted by the access point 116 may generate a wireless personal area network (WPAN), and include, for example, a Bluetooth® radio signal or infrared signal. In some arrangements, the wireless network includes a WI-FI signal, a WiMAX signal, wireless WAN signal, or the like.

The wireless network signal broadcasted by the merchant network agent 110 is received by other computing devices, such as the customer computing device 140 and merchant computing system 120. Upon receiving the wireless network signal from the network agent 110, the other devices may be authenticated by the methods disclosed herein to gain complete access to the merchant local network 105. For example, upon authenticating a customer via the customer computing device 140, encryption keys may be exchanged between the customer computing device 140 and the merchant network agent 110 enabling the customer computing device 140 to exchange information with additional computing systems. In some embodiments, the merchant network agent 110 provides external devices with access to an external network (e.g., the network 150).

In various embodiments, the wireless network signal broadcasted by the access point 116 includes a unique identifier associated with the merchant local network 105. In an example embodiment, the unique identifier includes a name of the merchant local network 105, which may be associated with the name of the merchant. As such, upon external devices, such as the customer computing device 140, receiving the signal from the access point 116, the customer computing device 140 may display the name of the merchant local network 105 to the customer and enable the customer to request to establish a connection with the merchant local network 105. Such an arrangement creates an opportunity for fraudsters to steal private information, as fraudsters may create networks having a unique identifier that mimics the unique identifier associated with the merchant local network 105.

The network control circuit 114 is configured to manage connections between the merchant network agent 110 and various other external devices. In this regard, the network control circuit 114 may include an authentication circuit (not shown) configured to authenticate requests to connect to the merchant local network 105 received from external devices. In an example embodiment, in response to the merchant network agent 110 receiving a request to connect to the merchant local network 105 from a requestor, the merchant network agent 110 transmits an authentication packet to the customer computing device 140 via the network control circuit 114. The authentication packet requests at least one authentication credential (e.g., a password) from the requestor. Upon receiving a requestor-input response to the authentication packet, the network control circuit 114 may compare the requestor-input response to a stored value and authenticate the request if a match is found. According to the systems and methods disclosed herein, the password may be a shared secret credential established for the customer based on a pre-existing relationship between the customer and merchant (e.g., a customer account). In some embodiments, the password may be based on a credential associated with a payments platform utilized by the customer to pay the merchant. For example, the network control circuit 114 may request mobile wallet credentials associated with a mobile wallet of the customer, and the network control circuit 114 may initiate communications with a mobile wallet computing system associated with the provider of the customer's mobile wallet to verify that customer-input mobile wallet credentials match credentials stored at the mobile wallet computing system (e.g., the mobile wallet computing system may verify the customer-input credentials and notify the merchant network agent 110 of the verification).

In some embodiments, the network control circuit 114 is configured monitor the various devices that are connected to the merchant local network 105. For example, when the customer computing device 140 first establishes a connection with the merchant network agent 110, the merchant network agent 110 may assign an IP address to the customer computing device 140 via the Dynamic Host Configuration Protocol (DHCP). Under such a protocol, the merchant network agent 110 may select an IP address from a pool of IP addresses stored at the merchant network agent 110 for customer computing devices 140 and temporarily or permanently assign the selected IP address to the customer computing device 140. In some arrangements, a network interface (e.g., the network interface 142) of the customer computing device 140 has a unique identifier (e.g., a MAC address) associated therewith. Communications between the customer computing device 140 and the merchant network agent 110 may include the unique identifier. As such, the network control circuit 114 may maintain a log of the various IP addresses assigned based on such unique identifiers. This way, based on the IP addresses currently assigned by the merchant network agent 110, the merchant network agent 110 may identify the specific external devices (and the identities of the customers associated therewith) connected to the merchant local network 105.

In some embodiments, the network control circuit 114 is configured to operate in concert with the merchant computing system 120 to authenticate requests to connect to the merchant local network 105. For example, in some embodiments, the network control circuit 114 receives data indicative of interactions (e.g., transactions) between the customer and the merchant, and establishes the received data as a network authentication credential for the customer. In some embodiments, the network control circuit 114 maintains an authentication credential directory. Such a directory may include a number of entries associated with various devices that have connected to the merchant local network 105. In an example, each entry is associated with a MAC address of an external device. The entries may include information regarding a plurality of transactions engaged in by the customer associated with the device. Using this stored information, the network control circuit 114 may generate a temporary network authentication credential used to authenticate the customer computing device 140 prior to authorizing connection of the external device to the merchant local network 105.

In an example, the customer purchases a product (e.g., a cup of coffee) at a merchant. In making such a purchase, the customer may provide payment information to the merchant (e.g., via the merchant computing system 120). Such payment information may include, for example a customer account number at a financial institution. The merchant computing system 120 may provide the received payment information to the merchant network agent 110. Alternatively or additionally, the merchant computing system 120 may transmit additional information (e.g., an identity of the purchased product, the amount of the purchase, the timing of the transaction, etc.) to the merchant network agent 110.

Upon receipt of such information regarding the customer purchase, the network control circuit 114 may establish an aspect of the data received from the merchant computing system 120 as a network authentication credential for the customer. To do this, the network control circuit 114 may first associate the received information regarding the purchase with an entry in the directory of network authentication credentials discussed above. For example, the directory may include a lookup table that matches portions of customer payment information (or information associated with an account of the customer at the merchant) to a particular external device (e.g., the customer computing device 140). As such, upon receipt of the customer payment information from the merchant computing system 120, the merchant network agent 110 may associate the information regarding the customer purchase with the customer computing device 140. After the association, the network control circuit 114 may select an aspect of the purchase information (e.g., a transaction amount, a product identity, etc.) to establish as a network authentication credential for the customer.

In some embodiments, the network control circuit 114 selects an aspect of the purchase data as an authentication credential upon receipt of a request to connect to the merchant local network 105 from the customer computer device 140. For example, based on a MAC address received from the customer computing device 140, the network control circuit 114 selects an aspect of the purchase data stored in the network authentication credential directory. In some embodiments, the network control circuit 114 establishes an aspect of the purchase data as an authentication credential prior to receiving a connection request from the customer computer device 140. This way, upon receipt of a connection request from the customer computer device 140, the merchant network agent 110 retrieves the established credential and compares it to any responses provided by the customer. In some embodiments, the merchant network agent 110 updates the authentication credential associated with the customer computing device 140 each time a connection request is received from the customer computing device 140. In some embodiments, the network control circuit 114 periodically (e.g., weekly) updates the authentication credential associated with the customer computing device 140.

In some embodiments, rather than receiving information regarding customer transactions from the merchant computing system 120, the network control circuit 114 is configured to transmit a notification signal to the merchant computing system 120 upon receipt of a connection request from the customer computing device 140. In such embodiments, the merchant computing system 120 may authenticate the connection request or provide an authentication credential to the merchant network agent 110.

In some embodiments, the network control circuit 114 is configured to establish accounts for customers who connect to the merchant local network but do not yet have accounts with the merchant. For example, the network control circuit 114 may determine if a particular customer has an account with a merchant based on communications with the customer computing device 140. For example, if the directory maintained in the merchant network agent 110 does not contain a MAC address associated with the customer computing device 140, the network control circuit 114 may determine that the customer does not have an account (or at least that the customer computing device 140 is not associated with the customer's account). In such cases, the merchant network agent 110 may transmit a registration packet to the customer computing device 140. The registration packet may prompt the customer to indicate a preference to establish a shared secret authentication credential for accessing the merchant local network 105.

In some embodiments, in response to the customer indicating a preference to establish a shared secret credential, the merchant network agent 110 (or the merchant computing system 120 or an external server) may transmit an application (e.g., the merchant client application 144 described below) to the customer computing device 140. The application may enable the customer to register payment accounts with the merchant computing system 120. As such, when the customer uses the registered payment accounts to engage in a transaction at the merchant, the merchant computing system 120 is able to tie the transactions to a particular customer account and render information regarding the transactions usable as an authentication credential for the merchant local network 105. Additionally, the application may enable the customer to view information regarding previous transaction at the merchant, thus facilitating the use of such information as a network authentication credential.

Still referring to FIG. 1, the merchant computing system 120 is a computing system associated with the merchant. In the example shown, the merchant computing system 120 includes a network interface 122 which enables the merchant computing system 120 to communicate data over the merchant local network 105, a customer database 124, a transaction circuit 126, an account management circuit 128, and a merchant input/output ("I/O") device 130. The merchant I/O device 130 includes hardware and associated logics configured to enable the merchant computing system 120 to exchange information with a customer and other merchant personnel. An input aspect of merchant I/O device 130 allows various users to provide information to the merchant computing system 120 and may include, for example, a mechanical keyboard, a touchscreen, a microphone, a camera, a fingerprint scanner, any user input device engageable to the merchant computing system 120 via a USB, serial cable, Ethernet cable, and so on. In some embodiments, the merchant I/O device 130 includes a point of sale (POS) device (e.g., a card reader or the like) configured to receive customer payment information from a payment card or mobile wallet presented by the customer to make a purchase at the merchant.

An output aspect of the merchant I/O device 130 allows users to receive information from the merchant computing system 120 and may include, for example, a digital display, a speaker, illuminating icons, LEDs, and so on. In some embodiments, the merchant I/O device 130 includes radio frequency transceivers (e.g., RF or NFC-based transceivers) and other short range wireless transceivers (e.g., Bluetooth™, laser-based data transmitters, etc.) configured to communicate data with external devices such as the customer computing device 120. For example, via such transceivers, the customer may make a payment for a purchase via a mobile wallet.

In some embodiments, merchant I/O device 130 includes a barcode or QR code scanner configured to gather information from various codes presented to the merchant computing system 120 by the customer. For example, at the time of a customer purchase, the customer may present a product having to be purchased to an attendant at the merchant computing system 120. In response, the attendant may scan a barcode attached to the product, causing the merchant computing system 120 (e.g., via the transaction circuit 126) to retrieve information regarding the product and present the information (e.g., a price) to the customer via a display device of the merchant I/O device 130.

In some embodiments, such a scanner enables the customer to make payments for purchases at the merchant. For example, the customer may have an account with the merchant, and have installed an application (e.g., the merchant client application 144) on the customer computing device 140, enabling the customer to fund the account. The application may enable the customer computing device 140 to generate a QR code to make a payment for a purchase. In response to scanning the QR code, the merchant computing system 120 may deduct the purchase amount from the customer's account.

The customer database 124 is configured to store information regarding accounts associated with a number of customers of the merchant. Customer account information may include, for example, customer identifying information, customer login information (e.g., usernames, passwords, and the like), payment information (e.g., credit or debit card numbers, bank account numbers, mobile wallet account numbers or addresses, etc.), customer account preferences (e.g., addresses, payment methods), and customer history information (e.g., transaction histories). Additionally, customer account information stored at the customer database 124 may also include information regarding the customer computing device 140. For example, the customer database 124 may include information regarding IP addresses assigned to the customer computing device 140 by the merchant network agent 110. Additionally, the customer database 124 may store network authentication credentials established for the customer.

The account management circuit 128 is configured to manage customer accounts at the merchant. In this regard, in some embodiments, the account management circuit 128 is configured to assign data regarding various transactions via the merchant computing system 120 to customer accounts. In this regard, upon the customer providing payment information (e.g., a primary account number associated with a customer payment account at a financial institution) to the merchant computing system 120, the account management circuit 128 may query the customer database 124 to determine if the customer input account information has been previously associated with an account established by the customer. If so, the account management circuit 128 may store data regarding the transaction (e.g., product purchased, transaction amount, transaction timing, location, etc.) in a transaction entry associated with an identified account. In some embodiments, in the event that a customer makes a payment using funds of an account held by the customer at the merchant (e.g., via the QR code discussed above), the account management circuit 128 may update the customer's account funding balance to reflect the payment.

In some embodiments, the account management circuit 128 is configured to transmit customer transaction data to an external server that provides an application (e.g., the merchant client application 144) to the customer computing device 140. For example, upon identifying that a particular transaction is associated with the customer's account, the account management circuit 128 may formulate an information packet identifying the customer's account, including the transaction information for transmittal to the external computing system over the network 150. After this information is transmitted to the external system, the customer may view the transaction by accessing the merchant client application 144. As such, if an aspect of the transaction is later used (e.g., by the merchant network agent 110) as a network authentication credential but the customer forgets the transaction, then the customer is able to view the transaction in the merchant client application 144 prior to entering the credential.

In some embodiments, the account management circuit 128 is configured to manage customer network authentication credentials. In this regard, the account management circuit 128 may be configured to transmit data stored in association with a customer account to the merchant network agent 110, which may establish a subset of the data as a user network authentication credential via the methods discussed above.

In some embodiments, the account management circuit 128 is configured to establish customer network authentication credentials. In this regard, the account management circuit 128 may select a subset of transaction information stored in association with a customer's account in the customer database 124 to establish as a customer network authentication credential. In some embodiments, the selection is based in part on previous customer network authentication credentials. For example, the account management circuit 128 may maintain a log of customer network authentication credentials used at various times and update the customer's authentication credential (e.g., to correspond to a different transaction of the customer or a different aspect of a transaction). If the customer's current network authentication credential has been used for more than a predetermined period, for example, the account management circuit 128 may select a subset of data among data describing the customer's most recent transactions at the merchant for establishment as a network authentication credential.

To establish the selected data as a customer network authentication credential, the account management circuit 128 may cause the merchant computing system 120 to transmit the credential to the merchant network agent 110. The merchant network agent 110 may store the credential in association with the customer computing device 140 (e.g., based on a MAC address) such that, when the next request to connect to the merchant local network 105 is received from the customer computing device 140, the customer is required to input information regarding a previous transaction to access the merchant local network 105. It should be understood that, according to various embodiments, the shared secret can be used for authentication using any of various methods such as challenge-response or it can be used as an input to a key derivation function to produce one or more keys to use for encrypting and/or MACing messages.

The transaction circuit 126 is configured to formulate transaction requests associated with various purchases of the customer. As such, the transaction circuit 126 is communicably coupled to the merchant I/O device 130, customer database 124, and network interface 122. For example, upon receiving customer payment information regarding a customer purchase, the transaction circuit 126 determines a total transaction amount (e.g., based on the identity of the product being purchased), bundles the total with the customer payment information to make a transaction request, and transmits the transaction request to a financial institution (e.g., associated with a customer payment card or mobile wallet) over the network 150. The financial institution may authorize the transaction and provide an indication of the authorization to the merchant computing system 120 over the network 150.

Still referring to FIG. 1, the customer computing device 140 is a computing device associated with a customer. The customer computing device 140 may be used by the customer to connect to the merchant local network 105. The customer computing device 140 includes one or more processors and non-transitory storage mediums housing one or more logics configured to enable the customer computing device 140 to exchange data over the network, execute software applications, access websites, generate graphical customer interfaces, and perform other operations. Examples of the customer computing device 140 include a personal computer (e.g., desktop or laptop computer), smartphones, tablets, wearable computing devices (e.g., a smartwatch), and the like. The customer computing device 140 may be configured to enable the customer to communicate information (e.g., transaction information) to merchant computing system 120.

In the example shown, the customer computing device 140 includes a customer network interface 142 enabling the customer computing device 140 to exchange data over the network 150, a merchant client application 144, and a customer I/O device 146. The customer I/O device 146 includes hardware and associated logics configured to enable the customer computing device 140 to exchange information with a customer (e.g., via hardware and associated logics similar to that discussed above with respect to the merchant I/O device 130).

The merchant client application 144 is structured to provide various displays on the customer computing device 140 that enable the customer to view information regarding various transactions engaged in by the customer at the merchant. Additionally, the displays may also enable the customer to register payment cards (e.g., debit cards, credit cards, and the like) with the merchant, and to fund a customer account at the merchant so as to enable the customer to engage in transactions at the merchant via the merchant client application 144 (e.g., via a QR code or the like).

In this regard, the merchant client application 144 may be communicably coupled to the merchant computing system 120 (or another external computing system configured to provide the merchant client application 144 to the customer computing device 140). In some embodiments, the merchant client application 144 is a separate software application implemented on the customer computing device 140. The merchant client application 144 may be downloaded by the customer computing device 140, be hard coded into the memory of the customer computing device 140, or be a web-based interface application such that the merchant client application 144 may provide a web browser to the application, which may be executed remotely from the customer computing device 140. In the latter instance, the customer may have to log onto or access the web-based interface before usage of the application. Further, and in this regard, the merchant client application 144 may be supported by a separate computing system including one or more servers, processors, network circuits, and so on that transmit applications for use to the customer computing device 140. In certain embodiments, the merchant client application 144 includes an application programming interface (API) and/or a software development kit (SDK) that facilitates the integration of other applications with the merchant client application 144.

Figure 2:
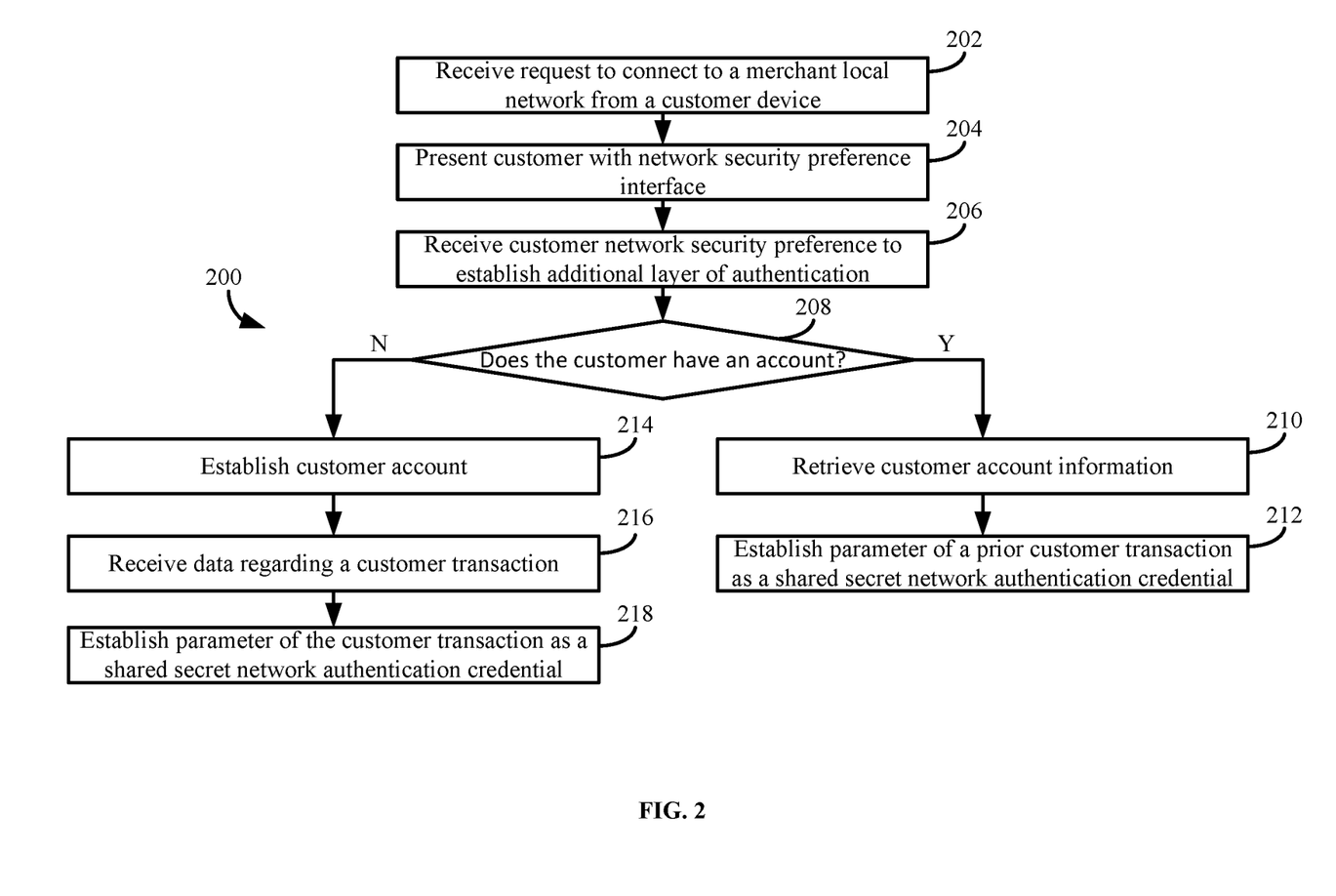
FIG. 2 is a flow diagram of a method of establishing a shared secret network authentication credential with a customer, according to an example embodiment.

Referring now to FIG. 2, a flow chart of a method 200 of establishing a shared secret as a network authentication credential is shown, according to an example embodiment. In various embodiments, the method 200 may be performed by a combination of the merchant network agent 110 (e.g., via the network control circuit 114) and the merchant computing system 120 (e.g., via the account management circuit 128).

At 202, a request to connect to the merchant local network 105 is received. For example, the customer may bring a customer computer device 140 within the range of the wireless signal broadcasted by the merchant network agent 110 such that the name of the merchant local network 105 shows up on the customer computing device 140 (e.g., as wireless network option to connect to). The customer may select the name, thereby causing a connection request to be transmitted by the customer computing device 140 to the merchant network agent 110.

At 204, the customer is presented with a network security preference interface. In some embodiments, the merchant network agent 110 determines if the customer has already established a shared secret network authentication credential based on the connection request received at 202. For example, the network control circuit 114 may query a database with a unique identifier (e.g., MAC address) included in the connection request. If the identifier is not in the database, the network control circuit 114 may determine that the customer has not established a shared secret network authentication credential and transmit a registration packet to the customer computing device 140. The registration packet may cause the customer computing device 140 (e.g., via a web browser) to present the customer with an interface enabling the customer to indicate a preference to establish the shared secret credential.

Figure 3:
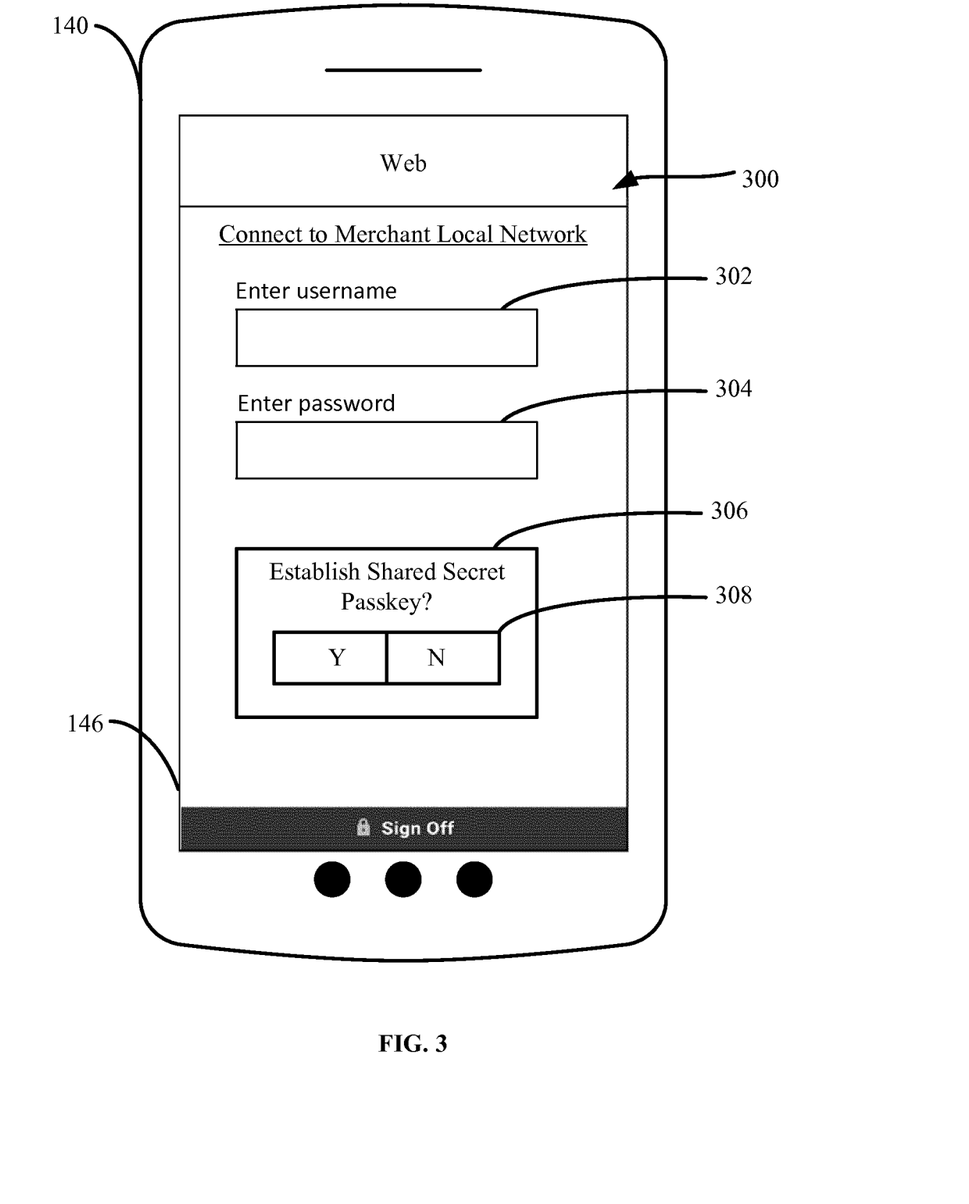
FIG. 3 is a network security user interface, according to an example embodiment.

Referring now to FIG. 3, a network security interface 300 is shown, according to an example embodiment. In some embodiments, the interface 300 is presented to a customer upon the customer requesting to connect to the merchant local network 105. For example, upon receiving a customer request to connect to the merchant local network 105, the merchant network agent 110 may query a database for entries regarding the customer computing device 140. If no entries are found (e.g., if no shared secret network credential has been established for the customer computing device 140), then the merchant network agent 110 transmits an authorization packet to the customer computing device 140, which presents the interface 300 to the customer.

The interface 300 includes a username entry field 302, a password field 304 and a shared secret preference window 304. The username entry field 302 and password entry field 304 are configured to receive a customer-input network credentials. Upon the customer inputting a credential into the credential entry field 302, the customer-input password may be transmitted to the merchant network agent 110, which may compare the customer-input credentials to a pre-established password for the merchant local network 105. The shared secret preference window 304 is configured to receive a customer input to establish a shared secret network credential for the merchant local network 105 via a customer preference selection button 306. In some embodiments, the shared secret preference window prompts the customer to indicate whether the customer has an account (e.g., a loyalty account) at the merchant. In some embodiments, the interface 300 may prompt the customer to input credentials (e.g., a username and password) associated with an account at the merchant.

Referring again to FIG. 2, at 206, a customer preference to establish a shared secret network authentication credential is received. For example, the customer may interact with the network security preference interface presented to the customer at 204 in such a way that indicates a customer preference to establish a shared secret network authentication credential.

At 208, upon receiving a customer input to establish a shared secret network credential, the merchant network agent 110 determines if the customer has established an account with the merchant. In some embodiments, the merchant network agent 110 makes this determination based on an input received from the customer. For example, based on information (e.g., authentication credentials) provided by the customer in response to the authorization packet transmitted to the customer computing device 140 at 206, the merchant network agent 110 may access a directory (e.g., the customer database 124) that includes information regarding various customer accounts. If the information input by the customer matches that of an account stored in the directory, then the merchant network agent 110 may determine that the customer has an account with the merchant. In some embodiments, the merchant network agent 110 maintains such a directory. In some embodiments, the merchant network agent 110 communicates with the merchant computing system 120, which maintains the directory, to determine if the customer has an account.

At 210, if the customer has an account with the merchant, customer account information is retrieved. In some embodiments, based on information received from the customer at 206, the merchant network agent 110 requests and receives information regarding a customer account from the merchant computing system 120. The requested information may contain information describing various aspects of the customer's account with the merchant (e.g., information regarding various customer transactions at the merchant). In some embodiments, a database similar to the customer database 124 is maintained at the merchant network agent 110, and the network control circuit 114 retrieves the customer account information based on information received from the customer computing device 140.

At 212, parameters of a prior customer transaction at the merchant are established as an initial shared secret network authentication credential. In this regard, the network control circuit 114 or merchant computing system 120 may perform a multi-step process to select the credential. First, a prior customer transaction (or prior customer interaction) at the merchant is selected. For example, in some embodiments, the network control circuit 114 selects the most recent transaction engaged in by the customer for establishment as a shared secret network authentication credential. In some embodiments, the network control circuit 114 selects from amongst a number of customer transactions that occurred within a predetermined time period of the customer indicating the preference to establish a shared secret network authentication credential. In some embodiments, rather than the network control circuit 114 selecting the customer transaction, such a selection is performed at the merchant computing system 120 (e.g., via the account management circuit 128).

Upon selecting a customer transaction, the network control circuit 114 selects a parameter of the selected transaction to establish as the shared secret. In various embodiments, the network control circuit 114 randomly selects from a number of different parameters such as timing, location, transaction amount, and the identity of the product purchased. To establish the selected parameter as the shared secret, the network control circuit 114 may transmit a second authorization packet to the customer computing device 140. The second authorization packet may cause the customer computing device 140 to present an additional interface to the customer. The additional interface may query the customer regarding the selected parameter for the prior customer transaction at the merchant.

Figure 4:
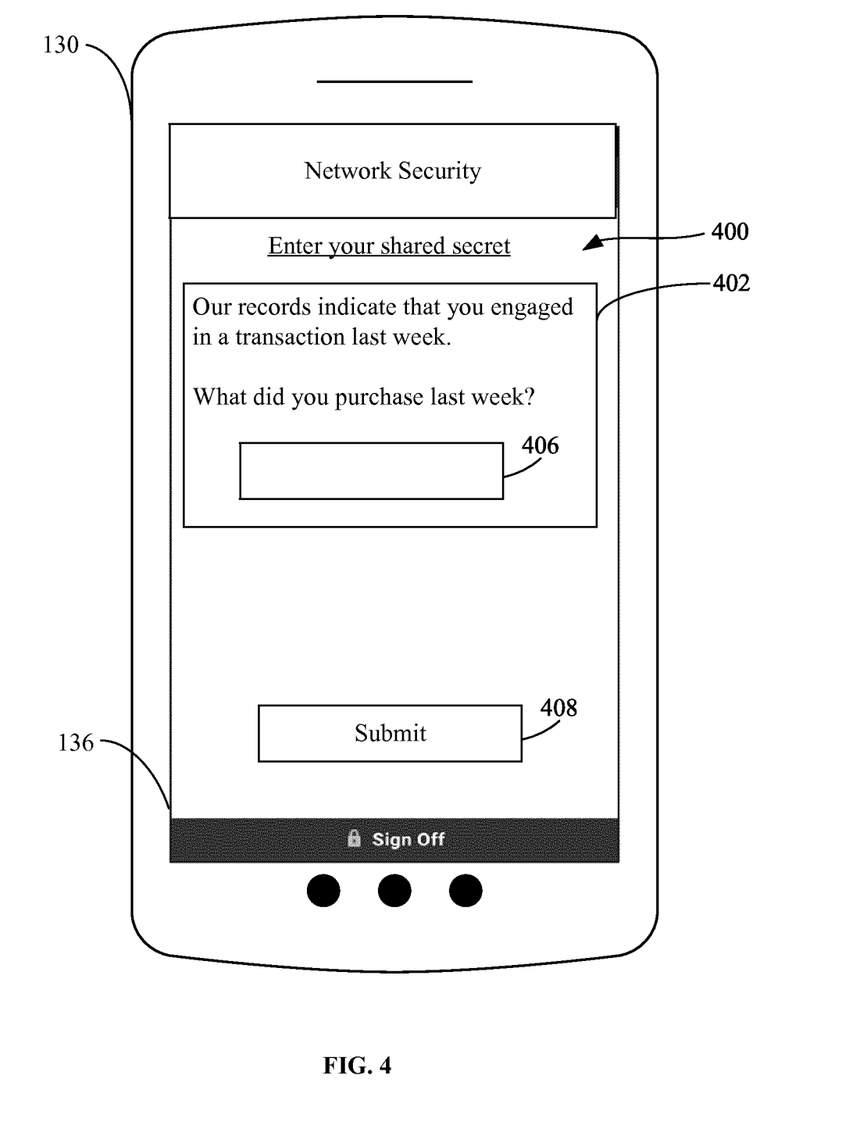
FIG. 4 is another network security user interface, according to an example embodiment.

Turning now to FIG. 4, a network security interface 400 is shown, according to an example embodiment. In an example embodiment, the interface 400 may be presented to the customer upon the merchant network agent 110 or the merchant computing system 120 selecting a parameter regarding a prior customer transaction to establish as a shared secret network authentication credential. In the example shown, the interface 400 includes a query window 402 and a submission button 408. The query window 402 contains a description of a prior customer transaction at the merchant as well as the parameter (e.g., product identity) of that transaction that was selected to serve as the customer's initial shared secret credential. The query window 402 prompts the customer to input information regarding the selected parameter via the data field 406. In some embodiments, the query window includes multiple options, one of which being the parameter selected to serve as the shared secret. The submission button 408 is configured to receive a customer input to transmit a customer-input response to the merchant network agent 110.

In various embodiments, the customer-input response must meet predetermined criteria prior to the customer being authorized to fully access the merchant local network 105. For example, in some embodiments, the customer-input response must match the selected parameter prior to the customer being authorized to connect to the merchant local network 105. To illustrate, in the example shown in FIG. 4, the customer-input description of a purchased product must match a predetermined merchant description (or one of a number predetermined merchant descriptions configured to account for customer spelling errors) of the purchased product. In some embodiments, the customer-input response must be within a threshold of the parameter selected to serve as the shared secret. To illustrate, if the amount of a prior customer transaction was selected to serve as the shared secret, the customer-input amount may have to be within a predetermined percentage (e.g., 10% of the actual transaction amount) in order for the customer to be authorized to fully access the merchant local network 105.

In some embodiments, upon the customer initially indicating a preference to establish a shared secret authentication credential for the merchant local network 105 (e.g., at 206), the directory at the merchant network agent 110 is updated such that the customer will automatically be prompted to input a shared secret prior to connecting to the merchant local network 105. In some embodiments, the customer's account settings are updated at the merchant computing system 120. For example, the directory information stored at the merchant network agent 110 may also be stored at the merchant computing system 120 or an external server. The directories at various other network agents (e.g., similar to the merchant network agent 110) affiliated with the merchant are also similarly updated. As such, when the customer seeks to access additional local network associated with the merchant (e.g., at a location different from the location of the merchant local network 105), the customer is also prompted to input a shared secret.

Referring back to FIG. 2, at 214, if the customer does not have an account at the merchant, then an account is established for the customer. In some embodiments, the merchant network agent 110 transmits a prompt to the customer computing device 140 instructing the customer to register for an account by providing identifying information (e.g., name, address, phone number, etc.). Additionally, the customer may also be prompted to provide payment information. Such identifying information may be transmitted by the merchant network agent 110 to the merchant computing system 120, which generates (e.g., via the account management circuit 128) a customer account and stores the identifying information in association with the account.

In some embodiments, the merchant network agent 110 transmits a prompt to the customer computing device 140 instructing customer to download an application (e.g., the merchant client application 144). Within the application, the customer may establish a set of login credentials for the new account. Additionally, the customer may register a payment account (e.g., a credit account or a debit account) within the application. The registered payment account may be used to fund the customer's account, enabling the customer to engage in transactions at the merchant using the customer account via the application. Additionally, the linking of a customer payment account to the customer's account at the merchant enables the merchant to link future customer purchases with the customer's account. As such, upon the customer engaging in transaction in the future at the merchant using the customer's account at the merchant, information regarding such transactions (e.g., regarding price, location, timing, product purchased, etc.) may be stored at the merchant computing system 120 (e.g., at the customer database 124) in relation to the customer's account.

In some embodiments, upon the customer establishing an account at the merchant, the customer is authorized to fully access the merchant local network 105 (e.g., during a time period after the request to connect to the merchant local network 105 was received at 202). For example, the customer may be prompted to input a password or the like that has been pre-established at the merchant. Alternatively, the customer may be automatically permitted to access the merchant local network 105 upon establishment of the customer's account. In various embodiments, the merchant network agent 110 assigns an IP address to the customer computing device 140 and stores the IP address in relation to a unique identifier (e.g., MAC address) received in previous communications with the customer computing device 140. As such, the same IP address may be assigned to the customer computing device 140 when the customer requests to access the merchant local network in the future.

At 216, data regarding a customer transaction is received. For example, at a later time, the customer may utilize the merchant client application 144 on the customer computing device 140 to engage in a transaction at the merchant. As discussed above the merchant client application 144 may include a mobile payment capability that provides customer payment credentials to the merchant computing system 120. For example, the merchant client application may generate a QR code having information regarding the customer account encoded thereon for presentation to a scanner included in the merchant I/O device 130. Upon scanning the QR code, the merchant computing system 120 (e.g., via the transaction circuit 126) deducts funds from the customer's account and stores information regarding the transaction in association with the customer's account in the customer database 124.

At 218, after the transaction is completed, the account management circuit 128 may establish a parameter of the transaction as a shared secret network authentication credential for the customer. In this regard, the account management circuit 128 may select a parameter of the transaction and transmit the parameter to the merchant network agent 110 for storage in a device directory (e.g., in association with the IP address previously assigned to the customer computing device 140). As such, upon the customer requesting to access the merchant local network 105 via the customer computing device 140 at a later time, the merchant network agent 110 prompts the customer to input information regarding the selected parameter (e.g., via an interface similar to the interface 400 discussed above).

Figure 5:
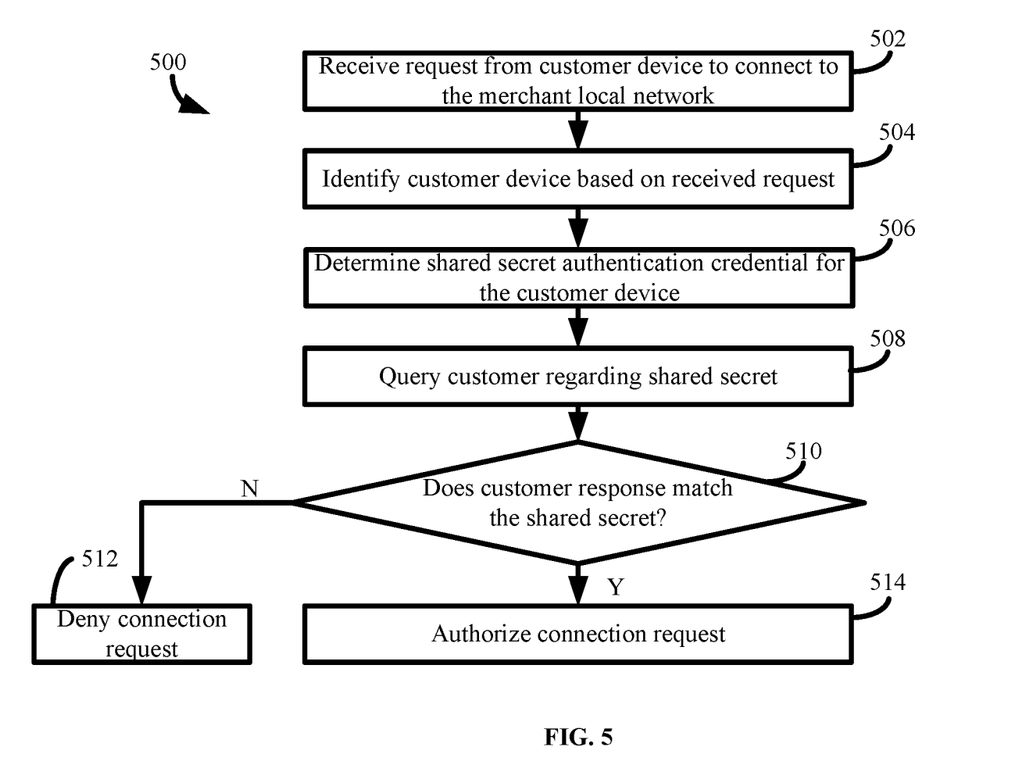
FIG. 5 is a flow diagram of a method of authorizing a network connection request, according to an example embodiment.

Referring now to FIG. 5, a flow chart of a method 500 of authorizing a network connection request is shown, according to an example embodiment. In various embodiments, the method 500 may be performed by the merchant network agent 110 (e.g., via the network control circuit 114) to provide a customer with access to the merchant local network 105.

At 502, a request to connect to the merchant local network 105 is received. For example, while the customer computing device 140 is within range of a wireless network signal broadcast by the merchant network agent 110 (e.g., while the customer is at a brick-and-mortar location associated with a particular merchant), the customer may indicate a preference to connect to merchant local network 105. In response to the customer indicating such a preference, the customer computing device 140 may establish a communications channel with the merchant network agent 110 via any established protocol and provide a network connection request to the merchant network agent 110.

At 504, the customer computing device 140 is identified based on the received request. In various embodiments, the request to connect to the merchant local network 105 received by the merchant network agent 110 includes an identifier (e.g., MAC address) associated with the network interface 142 of the customer computing device 140. As discussed above, assuming the customer computing device 140 has connected to the merchant local network 105 prior to the time of receipt of the network connection request at 502, this identifier may be stored in a device directory of the merchant network agent 110. As such, the network control circuit 114 may identify the customer computing device 140 based on the request received at 502 via the directory.

At 506, a shared secret network authentication credential for the customer computing device 140 is determined. In some embodiments, the network control circuit 114 retrieves a pre-established shared secret credential from the memory of the merchant network agent 110. In some embodiments, the merchant computing system 120 performs a process to provide shared secret credentials to the merchant network agent 110. For example, the merchant computing system 120 may periodically retrieve data from the customer database 124 that is associated with customers who have registered for a shared secret credential (e.g., via the method 200 discussed above), select a parameter regarding a recent customer transaction (e.g., a customer transaction within a predetermined time period), and provide information regarding the parameter to the merchant network agent 110 for storage in association with the customer computing device 140 in the device directory.

In some embodiments, each time the customer engages in a transaction with the merchant via a customer account established at the merchant, the merchant computing system 120 undergoes a process to update the customer's shared secret network authentication credential. This way, an aspect of the customer's most recent transaction at the merchant is always used as the shared secret, and the customer is most likely to remember various aspects of the transaction. As such, upon the merchant computing system 120 receiving data regarding a customer transaction (e.g., a payment from the customer via an account with the merchant, the scanning of a customer loyalty card, etc.), the account management circuit 128 selects an aspect of the transaction and transmits data regarding that aspect to the merchant network agent 110 in association with a customer account identifier. In response, the merchant network agent 110 updates an entry in the directory of devices associated with the customer computing device 140. This way, upon receipt of a connection request from the customer computing device 140, the merchant network agent 110 retrieves the shared secret.

In some embodiments, each time the merchant network agent 110 receives a request from the customer computing device 140 to connect to the merchant local network 105, the shared secret credential is updated. Accordingly, the merchant network agent 110 may store information regarding recent transactions of the customer, or the merchant network agent 110 may query the customer database 124 of the merchant computing system 120 in response to receiving the connection request from the customer computing device 140 for information regarding recent transactions of the customer. From the information regarding recent transactions of the customer, the network control circuit 114 may select an aspect of a recent customer transaction to establish as the shared secret credential.

In some embodiments, in response to receiving the connection request, the merchant network agent 110 requests the merchant computing system 120 to formulate a customer shared secret credential. In response the merchant computing system 120 (e.g., via the account management circuit 128) retrieves customer account information from the customer database 124, selects an aspect of a customer transaction to utilize as a shared secret, and transmits the shared secret to the merchant network agent 110.

At 508, the customer is queried regarding the shared secret. In various embodiments, after determining the customer shared secret, the merchant network agent 110 transmits an authorization packet to the customer computing device 140. The authorization packet may cause an interface (e.g., similar to the interface 400 discussed in relation to FIG. 4) to be presented to the customer that instructs the customer to input information regarding an aspect of a recent customer transaction or interaction with the merchant. The interface may present the customer with a plurality of choices, with one of the choices describing an aspect of the recent customer transaction. Alternatively, the interface may request the customer to manually input a response to the query.

At 510, the network control circuit 114 determines if the customer-input response matches the customer shared secret credential for the purpose of authenticating the connection request. In some embodiments, the customer-input response may be within a predetermined threshold of the actual shared secret to authenticate the customer. For example, if the customer shared secret corresponds to an amount of a recent customer transaction, then the network control circuit 114 may compare a customer-input response to an actual amount of a previous customer transaction. If the customer-input response is within a threshold of the actual amount, the customer may be authenticated. In some situations, the customer-input response must exactly match an aspect of a previous customer transaction in order for the customer to be authenticated. For example, if the customer shared secret is the identity of a product, then the customer must input the correct product name in order to be authenticated.

If the customer-input response does not match the shared secret, then the connection request is denied at 512. As a result, the customer is prevented from having full access to the merchant local network 105. However, if the customer-input response matches the shared secret, the connection request is authorized at 514. As such, the customer computing device 140 is able to communicate data over the network 150 via a connection with the merchant local network 105. Additionally, because the shared secret credential involves an actual transaction of the customer at the merchant, the customer is able to ascertain the legitimacy of the merchant local network 105. This way, it is difficult for fraudsters to emulate the authentication processes described herein, as fraudsters will not have access to data regarding customer accounts at the merchant.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A method, comprising:
   associating, by a computing system, system associated with a merchant, a customer device of a customer with a financial transaction record and the merchant, the financial transaction record indicative of a first purchase from the merchant by the customer and completed a predetermined period of time prior to a first request to connect to a network provided by the merchant;
   receiving, by the computing system, the first request to connect to the network provided by the merchant from the customer device after completion of the first purchase;
   selecting, by the computing system, the financial transaction based on the predetermined time period and the merchant;
   transmitting, by the computing system, a first query to the customer device prompting the customer to input information regarding an aspect of the first purchase, the first query including a description of a predetermined product parameter of the financial transaction record indicative of the first purchase from the merchant by the customer, the aspect of the first purchase established as a network authentication credential for the customer for the network provided by the merchant;
   receiving, by the computing system, a customer-input response to the first query; authenticating, by the computing system, the first request by determining that the customer-input response to the first query corresponds to the established aspect of the first purchase in accordance with a predetermined accuracy threshold, the predetermined accuracy threshold being associated with a maximum difference between the customer-input response and the established aspect of the first purchase; and
   authorizing, by the computing system, connection of the customer device to the network provided by the merchant based at least in part on the first request being authenticated.

2. The method of claim 1, wherein the description indicative of the purchase includes at least one of a timing of the first purchase, a transaction amount of the first purchase, an identity of a purchased product or service in the first purchase, and a location of the first purchase.

3. The method of claim 2, wherein the aspect of the first purchase established as a network authentication credential includes the transaction amount of the first purchase or whether the first query requests the customer to identify an approximate amount of the first purchase.

4. The method of claim 2, wherein the aspect of the purchase established as a network authentication credential includes the identity of a product or service purchased in the first purchase, wherein the first query requests the customer to identify the purchased product or service.

5. The method of claim 1, wherein the predetermined time period is at most one hour prior to the request to connect to the network is received.

6. The method of claim 1, further comprising:
receiving, by a computing system, a description indicative of a second purchase by a customer, the second purchase occurring after the first purchase;
updating, by the computing system, the network security credential of the customer to include an aspect of the second purchase;
receiving, by the computing system, a second request to connect to the network from the customer device;
transmitting, by the computing system, a second query to the customer device prompting the customer to input information regarding the aspect of the second purchase;
receiving, by the computing system, a customer-input response to the second query;
authenticating, by the computing system, the second request by determining that the customer-input response to the second query corresponds to the established aspect of the second purchase; and
authorizing, by the computing system, connection of the customer device to the network based at least in part on the second request being authenticated.

7. The method of claim 1, wherein the description indicative of the first purchase includes at least one of a customer device identifier and a customer payment account number.

8. The method of claim 1, wherein the establishing includes:
transmitting, by the computing systems, the aspect of the first purchase to a network agent associated with the merchant, and
associating, by the network agent, the aspect of the first purchase with information indicative of an identity of the customer device.

9. The method of claim 1, wherein the aspect of the first purchase is established in response to receipt of the first request to connect to the network provided by the merchant.

10. The method of claim 1, further comprising:
identifying, by the computing system, a user account of the customer in a customer database;
storing, by the computing system, the description indicative of the first purchase in a transaction entry of the identified user account;
receiving, by a computing system, description indicative of a second purchase by a customer, the second purchase occurring after the first purchase;
storing, by the computing system, the description indicative of the second purchase in a transaction entry of the identified user account;
receiving, by the computing system, a second request to connect to the network provided by the merchant; and
updating, by the computing system, the network security credential of the customer to include an aspect of the second purchase.

11. The method of claim 1, further comprising:
updating, by the computing system, an entry in a network authentication directory associated with the customer device to include the aspect of the first purchase as a network authentication credential for the customer device in response to receiving the description indicative of the first purchase, the network authentication directory storing network authentication credentials for customer devices associated with the computing system; and
retrieving, by the computing system, the aspect of the first purchase from the directory of devices at the entry, in response to receiving the first request to connect to the network provided by the merchant.

12. A merchant computing system comprising:
a network interface enabling the computing system to exchange information over a network provided by the merchant;
a customer database configured to store information pertaining to a plurality of customer purchases of a plurality of customers, wherein the customer purchases are from the merchant; and
a processing circuit configured to:
associate a customer device of a customer with a financial transaction record and the merchant, the financial transaction record indicative of a first purchase from the merchant by the customer and completed a predetermined period of time prior to a first request to connect to the network provided by the merchant;
receive, by the network interface, the first request to connect to the network from the customer device after completion of the first purchase; select the financial transaction based on the predetermined time period and the merchant;
transmit, by the network interface, a first query to the customer device prompting the customer to input information regarding an aspect of the first purchase, the first query including a description of a predetermined product parameter of the financial transaction record indicative of the first purchase from the merchant by the customer, the aspect of the first purchase established as a network authentication credential for the customer for the network provided by the merchant;
receive, by the network interface, a customer-input response to the first query;
authenticate the first request by determining that the customer-input response to the first query corresponds to the established aspect of the first purchase in accordance with a predetermined accuracy threshold, the predetermined accuracy threshold being associated with a maximum difference between the customer-input response and the established aspect of the first purchase; and
authorize connection of the customer device to the network based at least in part on the first request being authenticated.

13. The system of claim 12, wherein the description indicative of the purchase includes at least one of a timing of the first purchase, a transaction amount of the first purchase, an identity of a purchased product or service in the first purchase, and a location of the first purchase.

14. The system of claim 12, wherein the aspect of the first purchase established as a network authentication credential includes the transaction amount of the first purchase.

15. The system of claim 12, wherein the first query requests the customer to identify an approximate amount of the first purchase.

16. The system of claim 12, wherein the aspect of the purchase established as a network authentication credential includes the identity of a product or service purchased in the first purchase, wherein the first query requests the customer to identify the purchased product or service.

17. The system of claim 12, wherein the processing circuit is further configured to:
- receive a description indicative of a second purchase by a customer, the second purchase occurring after the first purchase;
- update the network security credential of the customer to include an aspect of the second purchase;
- receive, by the network interface, a second request to connect to the network from the customer device;
- transmit, by the network interface, a second query to the customer device prompting the customer to input information regarding the aspect of the second purchase;
- receiving, by the network interface, a customer-input response to the second query;
- authenticate, by the computing system, the second request by determining that the customer-input response to the second query corresponds to the established aspect of the second purchase; and
- authorize, by the computing system, connection of the customer device to the network based at least in part on the second request being authenticated.

18. One or more non-transitory computer readable media having computer-executable instructions provided therein, when executed by a computing system associated with a merchant, causes the computing system to authorize a request to connect to a network provided by the merchant, comprising:
- associating a customer device of a customer with a financial transaction record and the merchant, the financial transaction record indicative of a first purchase from the merchant by the customer and completed a predetermined period of time prior to a first request to connect to the network provided by the merchant;
- receiving the first request to connect to the network provided by the merchant from the customer device after completion of the first purchase;
- selecting the financial transaction based on the predetermined time period and the merchant;
- transmitting a first query to the customer device prompting the customer to input information regarding an aspect of the first purchase, the first query including a description of a predetermined product parameter of the financial transaction record indicative of the first purchase from the merchant by the customer, the aspect of the first purchase established as a network authentication credential for the customer for the network provided by the merchant;
- receiving a customer-input response to the first query;
- authenticating the first request by determining that the customer-input response to the first query corresponds to the established aspect of the first purchase in accordance with a predetermined accuracy threshold, the predetermined accuracy threshold being associated with a maximum difference between the customer-input response and the established aspect of the first purchase; and
- authorizing connection of the customer device to the network provided by the merchant based at least in part on the first request being authenticated.

19. The non-transitory computer readable media of claim 18, wherein the description indicative of the purchase includes at least one of a timing of the first purchase, a transaction amount of the first purchase, an identity of a purchased product or service in the first purchase, and a location of the first purchase.

20. The non-transitory computer readable media of claim 18, wherein the operations further comprise:
- receiving a description indicative of a second purchase by a customer, the second purchase occurring after the first purchase;
- updating the network security credential of the customer to include an aspect of the second purchase;
- receiving a second request to connect to the network provided by the merchant from the customer device;
- transmitting a second query to the customer device prompting the customer to input information regarding the aspect of the second purchase;
- receiving a customer-input response to the second query;
- authenticating the second request by determining that the customer-input response to the second query corresponds to the established aspect of the second purchase; and
- authorizing connection of the customer device to the network provided by the merchant based at least in part on the second request being authenticated.

\* \* \* \* \*